Aug. 2, 1966   W. C. PIERCE   3,263,784
MAGNETIC CLUTCH
Filed March 30, 1964
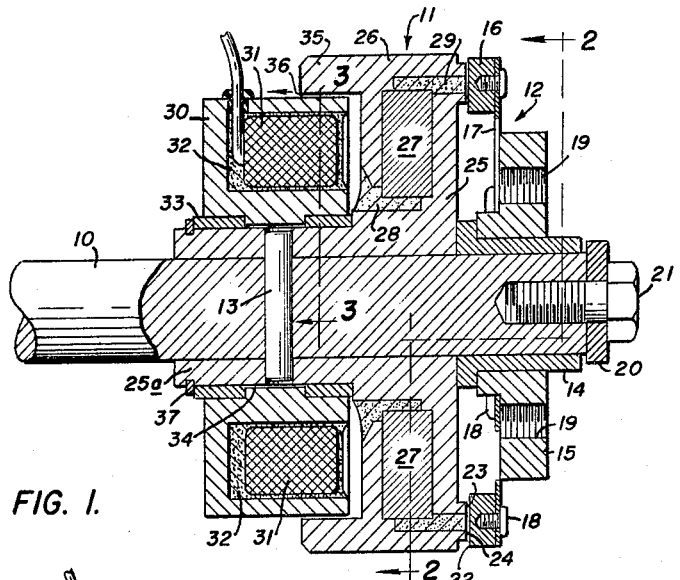
FIG. 1.
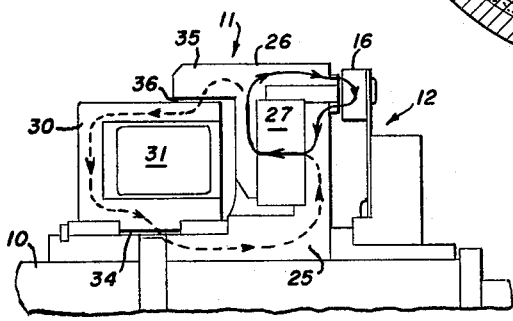
FIG. 3.
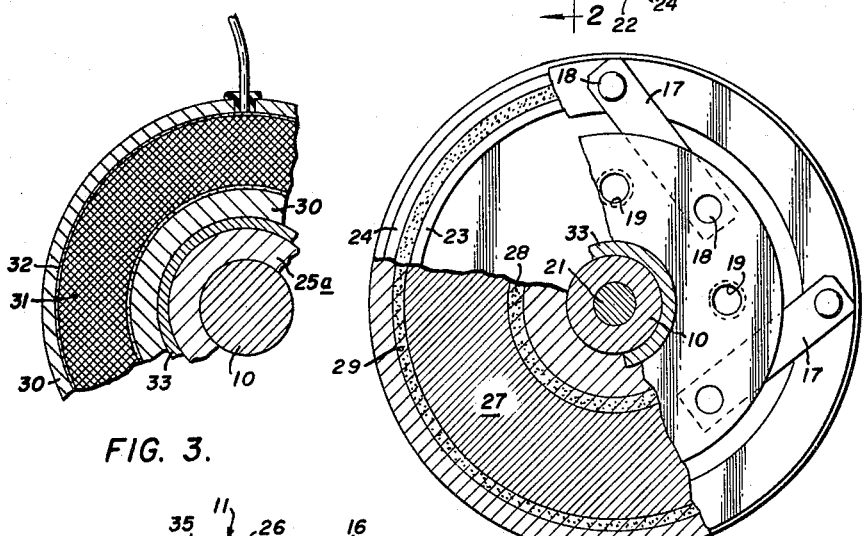
FIG. 2.
FIG. 4.
WILLIAM C. PIERCE
INVENTOR.
BY *Herbert J. Brown*
ATTORNEY

United States Patent Office 3,263,784
Patented August 2, 1966

3,263,784
MAGNETIC CLUTCH
William C. Pierce, Dallas, Tex., assignor to Pitts Industries, Inc., Dallas, Tex., a corporation of Tennessee
Filed Mar. 30, 1964, Ser. No. 355,616
4 Claims. (Cl. 192—84)

This invention relates to electromagnetic clutches of the type wherein a permanent magnet is employed to hold driving and driven elements in functional engagement. Particularly, the present invention is directed to an electromagnetic friction device wherein frictional engagement of the driving and driven elements is maintained by a permanent magnet and released by a coil which diverts flux from the permanent magnet circuit to the coil circuit.

An object of the invention is to provide a magnetic clutch having a ceramic type circular permanent magnet in its rotor for normally maintaining the armature disc in frictional engagement, together with an arrangement of parts providing an economical construction.

Another object is to provide a magnetic clutch construction having improved efficiency, particularly by elimination of a keeper circuit or the like heretofore required in clutches of the same general type.

A particular object of the invention is to provide a magnetic clutch which fully releases the armature at a predetermined lowered magnetic level.

These and other objects of the invention will become apparent from the following description and the accompanying drawing, wherein:

FIGURE 1 is a sectional and partly elevational view of a magnetic clutch embodying the features of the invention.

FIGURE 2 is an elevational and sectional view taken on line 2—2 of FIGURE 1.

FIGURE 3 is a fragmentary sectional view taken on line 3—3 of FIGURE 1, and

FIGURE 4 is a diagrammatic view showing the clutch in its disengaged position.

The clutch shown in the drawing includes a drive shaft 10 having a rotor 11 and armature 12 mounted thereon in juxtaposition. A pin 13 through a sleeve portion of the rotor 11 and through the shaft 10 secures these parts against relative rotation, whereas the armature is mounted for free rotation except when frictionally engaged to the rotor in the manner to be described.

The armature 12 consists of a shouldered sleeve bearing 14 on the shaft, the shouldered end of which sleeve is adjacent the face of the rotor 11, a hub 15 pressed on the sleeve, a circular flat ring of magnetic material herein referred to as the armature disc 16, and leaf springs 17 connecting the armature disc with the hub. The outside diameter of the armature disc 16 is substantially equal to the outside diameter of the rotor 11. As best shown in FIGURE 2, the springs 17 are diagonally disposed relative to the radii of the assembly whereby the springs may be relatively long. The springs 17 are secured to the outer face of the disc 16 and to the inner face of the hub 15 by screws 18. The outer face of the hub 15 has tapped holes 19 for connection with a machine or device to which power is to be delivered, for example, a radial fan, not shown. The armature 12 is secured on the shaft 10 by a washer 20 and screw 21 threaded in the end of the shaft. The surface of the armature disc 16 opposite the rotor 11 is herein referred to as the armature pole face 22 and is of sufficient width to oppose inner and outer rotor pole faces 23 and 24.

The rotor 11 is comprised of inner and outer circular body members 25, 26 including, respectively, the inner and outer rotor pole faces 23, 24. Within the rotor 11 and between the body member 25, 26, and in recesses (not numbered) provided therefor, there is a relatively flat circular permanent magnet 27 of ferrite ceramic material. Magnets of this type are resistant to demagnetization and have the additional characteristic of having their pole faces at their flat surfaces, which characteristic is of importance to the present invention, as will become apparent. Non-magnetic potting compound 28, 29 is provided at the inner and outer circumference of the magnet 27, and which compound separates the rotor body members 25, 26.

There is a stationary coil shell 30 around the sleeve portion 25a of the inner rotor member 25, and which shell is C-shaped in cross section to receive a coil 31 which is secured in place by potting compound 32. The inner circumferences of the shell 30 are recessed to receive bearings 33 of non-magnetic material mounted on the rotor sleeve portion 25a and the center portion of th shell is spaced from the rotor sleeve portion to provide an air gap 34 therebetween. An integral lateral flange 35 at the outer circumference of the outer rotor body member 26 extends partly over, but is spaced from the outer circumference of the shell 30 to provide an additional air gap 36. A locking ring 37 secures the outer bearing 33 against outward displacement.

The operation of the clutch is illustrated in FIGURE 4, and while the armature disc 16 is shown in its disengaged position, it is to be understood that the coil 31 is energized at this time causing a circuit as shown by the dotted line and arrows. The permanent magnet or pole face circuit, as shown by the solid line and arrows, is not in operation at this time.

When the coil 31 is off, the flux of the permanent magnet 27 will travel through the path illustrated by the solid line in the direction of the arrows and the density at the pole faces 24, 23 will become great enough to overcome the springs 17 and to attract the armature disc 16 into frictional engagement with the rotor 11 and thereby transmit torque to the hub 15 or other driven element, not shown. The path of this circuit, sometimes called the working circuit, is from the inner face of the permanent magnet 27, through the outer rotor body member 26, across the outer rotor pole face 24, through the armature disc 16, across the inner rotor pole face 23, and through the inner rotor body member 25 to the outer face of the magnet 27.

When the coil 31 is energized, the circuit generated thereby follows in the direction indicated by the dotted line and the arrows, that is, through the shell 30, across the air gap 34, through the inner rotor body member 25, to the outer face of the magnet 27, from the inner face of the magnet through the outer rotor body member to the flange 35, and across the air gap 36 back to the shell 30. This induced circuit, or coil circuit, diverts flux from the circuit passing through the pole faces and armature disc 16. This diversion reaches a point of release and allows the springs 17 to move the disc 16 away from the rotor 11. It is to be noted that both circuits flow through the magnet in the same direction, and thus the magnet is not subjected to demagnetization as in magnetic clutches where the coil circuit, when applied, is opposed to the polarity of the magnet.

By reason of the described construction, an inexpensive ring shaped permanent magnet, such as 27 may be used. A keeper circuit to maintain magnetic level is not required, and thus permits a greater percentage of the permanent magnet flux to be utilized at the pole faces 23, 24 for producing torque. The only loss of flux will be a small percentage that remains in the coil circuit (dotted lines) after the coil is de-energized, and this amount is necessarily low because of the magnetic reluctance caused by the two air gaps 34 and 36.

The invention is not limited to the exemplary construction herein shown and described, but may be made in various ways within the scope of the appended claims.

What is claimed is:

1. A magnetic clutch comprising a drive shaft, a rotor mounted on said shaft and secured to turn therewith, an armature mounted for free rotation on said shaft, a stationary coil shell coaxially mounted relative to said shaft, a coil contained within said shell whereby the flux density is increased in the shell and decreased in the armature when said coil is energized, and a permanent magnet within said rotor, said rotor being comprised of inner and outer rotor members each contacting a different pole surface of said magnet, each said member having a rotor pole face on a side thereof adjacent said armature, said armature including an armature disc, spring means normally urging said disc away from said rotor, the pole face of which disc is opposite and normally engaged with said rotor pole faces, means providing an air gap between an outer circular portion of said shell and said outer rotor member, and means providing an air gap between an inner circular portion of said shell and said inner rotor member, both said air gaps being of length and width proportions to result in the largest portion of the magnetic flux from the permanent magnet to be conducted through the rotor pole faces and armature disc, and the lesser portion through the coil shell, and whereby high magnetic inductance is retained in the permanent magnet.

2. A magnetic clutch as defined in claim 1 and wherein the coil circuit and the pole face circuit are in the same direction where they flow through said magnet.

3. A magnetic clutch as defined in claim 1, and wherein said permanent magnet is a circular relatively flat ferrite ceramic magnet having its poles on the faces thereof.

4. A magnetic clutch as defined in claim 3, and wherein said inner rotor member and said outer rotor member are separated at the inner and outer circumferences of said magnet by non-conductor potting compound.

References Cited by the Examiner
UNITED STATES PATENTS

| | | | |
|---|---|---|---|
| 2,956,658 | 10/1960 | Jaeschke | 192—84 |
| 2,983,350 | 5/1961 | Schultz | 192—84 |
| 3,044,594 | 7/1962 | Bernard | 192—84 |
| 3,053,365 | 9/1962 | Allen | 192—84 |
| 3,055,470 | 9/1962 | Pierce | 192—84 |
| 3,177,997 | 4/1965 | Louzecky | 192—84 |
| 3,181,671 | 5/1965 | Gruenbeck et al. | 192—84 |

DAVID J. WILLIAMOWSKY, *Primary Examiner.*

DON A. WAITE, *Examiner.*

A. T. McKEON, *Assistant Examiner.*